US010811704B2

(12) United States Patent
Abe et al.

(10) Patent No.: US 10,811,704 B2
(45) Date of Patent: Oct. 20, 2020

(54) FUEL CELL SYSTEM WITH VALVE CONTROL FOR DISCHARGING ANODE OFF GAS, AND METHOD OF OPERATING THE SAME

(71) Applicant: Panasonic Intellectual Property Management Co., Ltd., Osaka (JP)

(72) Inventors: Miki Abe, Osaka (JP); Akinori Yukimasa, Nara (JP); Junji Morita, Kyoto (JP); Takehiko Ise, Osaka (JP); Yoshito Usuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 129 days.

(21) Appl. No.: 15/818,746

(22) Filed: Nov. 21, 2017

(65) Prior Publication Data
US 2018/0151897 A1  May 31, 2018

(30) Foreign Application Priority Data
Nov. 28, 2016 (JP) .................... 2016-230052

(51) Int. Cl.
*H01M 8/04089* (2016.01)
*H01M 8/04298* (2016.01)
(Continued)

(52) U.S. Cl.
CPC ... *H01M 8/04097* (2013.01); *H01M 8/04179* (2013.01); *H01M 8/04201* (2013.01);
(Continued)

(58) Field of Classification Search
CPC ......... H01M 8/04097; H01M 8/04164; H01M 8/04141; H01M 8/04179; H01M 8/04201; H01M 8/04231; H01M 8/04298
See application file for complete search history.

(56) References Cited

U.S. PATENT DOCUMENTS 6,013,385 A * 1/2000 DuBose ............ H01M 8/04014
429/410
2008/0248338 A1* 10/2008 Yano ................. H01M 8/04104
429/498
(Continued)

FOREIGN PATENT DOCUMENTS

DE 102009036197 A1 2/2011
DE 102010046012 A1 3/2012
(Continued)

OTHER PUBLICATIONS

Partial European Search Report (R.64 EPC) dated Apr. 20, 2018 for the related European Patent Application No. 17203429.0.
(Continued)

*Primary Examiner* — Imran Akram
(74) *Attorney, Agent, or Firm* — McDermott Will & Emery LLP

(57) ABSTRACT

A fuel cell system includes a fuel cell, a first supply flow path, a second supply flow path, a recycle flow path, a circulator, a discharge flow path, a reservoir, a valve, and a controller. The controller opens the valve, determines an open time, for which the valve is opened to discharge the anode off gas, on the basis of the amount of water stored in the reservoir, the discharge time of water that flows through the discharge flow path to be discharged, and the discharge amount of the anode off gas that flows through the discharge flow path to be discharged, and closes the valve when an elapsed time for which the valve is opened reaches the open time.

10 Claims, 7 Drawing Sheets

(51) Int. Cl.
*H01M 8/04082* (2016.01)
*H01M 8/0438* (2016.01)
*H01M 8/04746* (2016.01)
*H01M 8/04119* (2016.01)
*H01M 8/0432* (2016.01)
*H01M 8/04537* (2016.01)
*H01M 8/1018* (2016.01)

(52) U.S. Cl.
CPC ... *H01M 8/04298* (2013.01); *H01M 8/04343* (2013.01); *H01M 8/04402* (2013.01); *H01M 8/04425* (2013.01); *H01M 8/04559* (2013.01); *H01M 8/04761* (2013.01); *H01M 8/04776* (2013.01); *H01M 2008/1095* (2013.01)

(56) References Cited

U.S. PATENT DOCUMENTS

| | | | | |
|---|---|---|---|---|
| 2009/0011302 | A1* | 1/2009 | Hamada | H01M 8/0441 |
| | | | | 429/423 |
| 2009/0269627 | A1* | 10/2009 | Zhang | H01M 8/02 |
| | | | | 429/436 |
| 2010/0015484 | A1* | 1/2010 | Ishigaki | H01M 8/04388 |
| | | | | 429/429 |
| 2010/0055523 | A1* | 3/2010 | Ogawa | H01M 8/04253 |
| | | | | 429/426 |
| 2010/0227238 | A1* | 9/2010 | Naganuma | H01M 8/0432 |
| | | | | 429/429 |
| 2012/0148927 | A1* | 6/2012 | Jeon, II | H01M 8/04843 |
| | | | | 429/414 |
| 2013/0164644 | A1* | 6/2013 | Noh | H01M 8/04619 |
| | | | | 429/431 |
| 2013/0164649 | A1* | 6/2013 | Nishimura | H01M 8/2483 |
| | | | | 429/444 |
| 2013/0209902 | A1* | 8/2013 | Mazzotta | H01M 8/04097 |
| | | | | 429/410 |
| 2014/0093797 | A1 | 4/2014 | Muetschele | |
| 2015/0214561 | A1* | 7/2015 | Araki | H01M 8/04179 |
| | | | | 429/414 |
| 2016/0141655 | A1* | 5/2016 | Naganuma | H01M 8/04313 |
| | | | | 429/414 |

FOREIGN PATENT DOCUMENTS

| | | |
|---|---|---|
| DE | 102011102336 A1 | 11/2012 |
| DE | 102012007374 A1 | 10/2013 |
| JP | 2005-141977 | 6/2005 |
| JP | 2006-286482 | 10/2006 |

OTHER PUBLICATIONS

The Extended European Search Report dated Jun. 22, 2018 for the related European Patent Application No. 17203429.0.

* cited by examiner

FUEL CELL SYSTEM WITH VALVE CONTROL FOR DISCHARGING ANODE OFF GAS, AND METHOD OF OPERATING THE SAME

BACKGROUND

1. Technical Field

The present disclosure relates to a fuel cell system and a method of operating the fuel cell system.

2. Description of the Related Art

Fuel cell systems generate power through an electrochemical reaction between hydrogen in a fuel gas supplied to an anode and oxygen in an oxidizing gas (air) supplied to a cathode. In order to enhance the efficiency of use of the fuel gas, there is proposed a method of circulating a fuel gas containing unreacted hydrogen discharged from the anode back to the fuel cell again.

In such a fuel system, water is generated through a reaction between hydrogen and oxygen as a result of power generation, and nitrogen in the oxidizing gas (air) enters, as impurities, the anode from the cathode. The concentration of such impurities is increased along with circulation of the fuel gas, which decreases the concentration of hydrogen in the fuel gas which is supplied to the anode and decreases the power generation performance of the fuel cell.

A fuel cell system according to Japanese Unexamined Patent Application Publication No. 2005-141977, which includes a fuel gas circulation flow path through which an anode off gas discharged from a fuel cell is supplied to the fuel cell again, is provided with a discharge valve that is capable of discharging a fuel gas from the fuel gas circulation flow path. A purge operation is performed each time the system is driven continuously for a certain time, and is performed in accordance with the status of power generation by the fuel cell. In the purge operation, the rate of release of the anode off gas is obtained on the basis of the pressure difference between the inlet pressure and the outlet pressure of the discharge valve, and the discharge valve is opened and closed in accordance with the obtained release rate.

A fuel cell system according to Japanese Unexamined Patent Application Publication No. 2006-286482 includes a circulation flow path through which a reaction gas is circulated in a fuel cell stack. The fuel cell system further includes a condensed water tank that stores condensed water and a discharge flow path that communicates with the condensed water tank and the circulation flow path. When power generation by the fuel cell stack is stopped, a purge operation is performed by opening a purge valve in the discharge flow path. Through the purge operation, the condensed water in the condensed water tank is discharged via the discharge flow path, and thereafter a reaction gas in the circulation flow path is discharged via the discharge flow path. When a transition is made from the discharge of the condensed water to the discharge of the reaction gas, the pressure in the discharge flow path is lowered, and therefore the purge valve is closed.

SUMMARY

However, the techniques according to the related art described in Japanese Unexamined Patent Application Publication No. 2005-141977 and Japanese Unexamined Patent Application Publication No. 2006-286482 still have room for improvement from the viewpoint of power generation efficiency and cost. One non-limiting and exemplary embodiment provides a fuel cell system and a method of operating the fuel cell system that may suppress a reduction in power generation efficiency and that may suppress an increase in cost.

In one general aspect, the techniques disclosed here feature a fuel cell system including: a fuel cell that generates power using a fuel gas and an oxidizing gas; a first supply flow path through which the fuel gas to be supplied to an anode of the fuel cell flows; a second supply flow path through which the oxidizing gas to be supplied to a cathode of the fuel cell flows; a recycle flow path which is connected between the anode and the first supply flow path and through which an anode off gas discharged from the anode flows; a circulator that is provided in the recycle flow path and that allows the anode off gas to flow into the first supply flow path; a discharge flow path which branches off from the recycle flow path and through which the anode off gas flows; a reservoir that is provided in the discharge flow path and that stores water condensed from the anode off gas; a valve provided in the discharge flow path downstream of the reservoir; and a controller, in which the controller, in a purge operation opens the valve, determines an open time, for which the valve is opened to discharge the anode off gas, based on an amount of the water stored in the reservoir, a discharge time of the water that flows through the discharge flow path to be discharged, and a discharge amount of the anode off gas that flows through the discharge flow path to be discharged, and closes the valve when an elapsed time for which the valve is opened reaches the open time.

The present disclosure achieves the effect in providing a fuel cell system and a method of operating the fuel cell system that suppress a reduction in power generation efficiency and that suppress an increase in cost.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
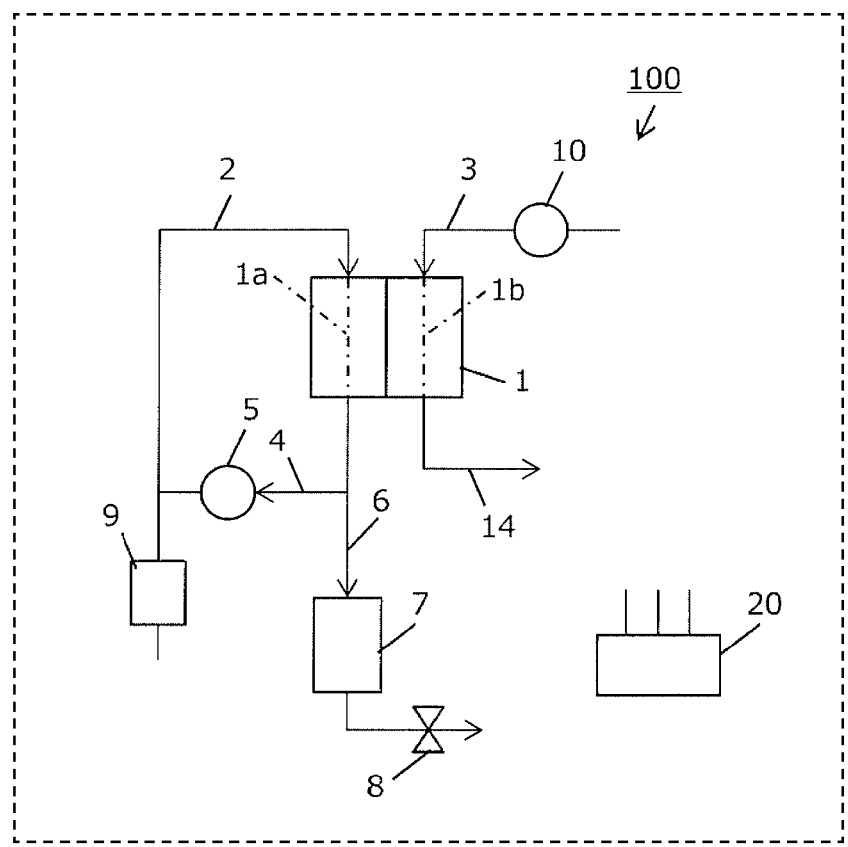
FIG. 1 is a block diagram schematically illustrating an example of the configuration of a fuel cell system according to Embodiment 1 of the present disclosure.

Underlying Knowledge Forming Basis of the Present Disclosure

The present inventors made a diligent study to suppress a reduction in power generation efficiency and suppress an increase in cost of the fuel cell systems. As a result, the present inventors found the following issues of the related art.

In order to suppress a reduction in power generation efficiency of the fuel cell systems, it is desirable to reduce the discharge amount of the anode off gas during the purge operation to a necessary minimum. In order to discharge only such a necessary minimum amount of the anode off gas, the discharge amount of condensed water discharged prior to the anode off gas should be taken into consideration.

However, the pressure in the discharge flow path for the anode off gas and the amount of condensed water remaining in the discharge flow path may differ in response to the state of power generation, which may fluctuate the time to discharge the condensed water and the anode off gas. Therefore, it is difficult to discharge only a necessary minimum amount of the anode off gas.

In the fuel cell system according to Japanese Unexamined Patent Application Publication No. 2005-141977, the rate of release of the anode off gas is obtained on the basis of the pressure difference between the inlet pressure and the outlet pressure of the discharge valve. However, the discharge time of the condensed water is not taken into consideration. In addition, pressure sensors that detect the inlet pressure and the outlet pressure of the discharge valve are required, which increases the cost.

In the fuel cell system according to Japanese Unexamined Patent Application Publication No. 2006-286482, the purge valve is closed by a pressure drop that occurs when a transition is made from the discharge of the condensed water to the discharge of the reaction gas. Therefore, the discharge amount of the reaction gas is not optimized, which leaves room for improvement.

In an aspect of the present disclosure, which is made on the basis of the above knowledge, the time to open the valve in order to discharge the anode off gas is determined on the basis of the amount of stored water, the discharge time of water, and the discharge amount of the anode off gas. Consequently, condensed water and the anode off gas can be discharged in appropriate amounts without using pressure sensors, which makes it possible to suppress a reduction in power generation efficiency and suppress an increase in cost of the fuel cell system.

Embodiments

According to a first aspect of the present disclosure, there is provided a fuel cell system including: a fuel cell that generates power using a fuel gas and an oxidizing gas; a first supply flow path through which the fuel gas to be supplied to an anode of the fuel cell flows; a second supply flow path through which the oxidizing gas to be supplied to a cathode of the fuel cell flows; a recycle flow path which is connected between the anode and the first supply flow path and through which an anode off gas discharged from the anode flows; a circulator that is provided in the recycle flow path and that allows the anode off gas to flow into the first supply flow path; a discharge flow path which branches off from the recycle flow path and through which the anode off gas flows; a reservoir that is provided in the discharge flow path and that stores water condensed from the anode off gas; a valve provided in the discharge flow path downstream of the reservoir; and a controller, in which the controller, in a purge operation, opens the valve, determines an open time, for which the valve is opened to discharge the anode off gas, based on an amount of the water stored in the reservoir, a discharge time of the water that flows through the discharge flow path to be discharged, and a discharge amount of the anode off gas that flows through the discharge flow path to be discharged, and closes the valve when an elapsed time for which the valve is opened reaches the open time.

With this configuration, the time (open time) to discharge the anode off gas is set in light of the status of discharge of water which is discharged prior to the anode off gas. Therefore, an appropriate amount of the anode off gas can be discharged, which suppresses a reduction in power generation efficiency due to discharge of hydrogen condensed from the fuel gas more than necessary. In addition, there is no need to provide a pressure sensor, which can suppress an increase in cost.

In a fuel cell system according to a second aspect of the present disclosure, which is based on the first aspect, the controller may determine a pressure in the discharge flow path based on the amount of the stored water and the discharge time of the water, and determine the open time based on the pressure in the discharge flow path and the discharge amount of the anode off gas. With this configuration, the discharge time of the anode off gas is varied in accordance with the pressure in the discharge flow path. Hence, the open time to discharge the anode off gas is determined in consideration of the pressure in the discharge flow path which is based on the amount of stored water and the discharge time of water which is discharged prior to the anode off gas. Consequently, an appropriate amount of the anode off gas can be discharged, which suppresses a reduction in power generation efficiency.

In a fuel cell system according to a third aspect of the present disclosure, which is based on the second aspect, the controller may determines the open time to be shorter as the pressure in the discharge flow path is higher. With this configuration, the time required to discharge the anode off gas is shorter as the pressure in the discharge flow path is higher. Hence, an appropriate amount of the anode off gas can be discharged by setting the open time to discharge the anode off gas to be short.

In a fuel cell system according to a fourth aspect of the present disclosure, which is based on any one of the first to third aspects, the controller determines the open time to be longer as the discharge time of the water is longer. With this configuration, as the discharge time of water is longer, the pressure in the discharge flow path is lower, and the time required to discharge the anode off gas is longer. Hence, an appropriate amount of the anode off gas can be discharged by setting the open time to discharge the anode off gas to be long.

A fuel cell system according to a fifth aspect of the present disclosure, which is based on any one of the first to fourth aspects, may further include a voltage detector that detects a voltage of the fuel cell, and the controller may determine the discharge time of the water based on the voltage which is detected by the voltage detector. With this configuration, the anode off gas is discharged after water is discharged, which increases the concentration of hydrogen in the fuel gas which is supplied to the fuel cell and raises the voltage of power generated by the fuel cell. Hence, the discharge time of water can be determined by detecting that water has been discharged on the basis of variations in voltage of generated power.

In a fuel cell system according to a sixth aspect of the present disclosure, which is based on the fifth aspect, the controller may determine the discharge time of the water when the voltage reaches a predetermined voltage. With this configuration, the anode off gas is discharged after water is discharged, which increases the concentration of hydrogen in the fuel gas which is supplied to the fuel cell and raises the voltage of power generated by the fuel cell to the predetermined voltage. Consequently, the discharge time of water can be determined by detecting that water has been discharged.

In a fuel cell system according to a seventh aspect of the present disclosure, which is based on the fifth aspect, the controller may determine the discharge time of the water when a rate of rise in the voltage reaches a predetermined rate. With this configuration, the anode off gas is discharged after water is discharged, which increases the concentration of hydrogen in the fuel gas which is supplied to the fuel cell and raises the voltage of power generated by the fuel cell. The discharge time of water can be determined by detecting that water has been discharged on the basis of the rate of rise in voltage.

A fuel cell system according to an eighth aspect of the present disclosure, which is based on any one of the first to seventh aspects, may further include a temperature detector that detects a temperature of the anode off gas which flows through the discharge flow path, and the controller may determine the amount of the stored water based on a flow rate of water vapor condensed from the anode off gas which is discharged from the fuel cell and the temperature which is detected by the temperature detector. With this configuration, the amount of water vapor in the anode off gas is obtained from the temperature of the anode off gas which flows through the discharge flow path, and the difference between the obtained amount of water vapor and the amount of water vapor in the anode off gas which is discharged from the fuel cell can be obtained as the amount of water condensed and stored (amount of stored water).

A fuel cell system according to a ninth aspect of the present disclosure, which is based on any one of the first to seventh aspects, may further include a water level detector that detects a water level of the water which is stored in the reservoir, and the controller may determine the amount of the stored water based on the water level which is detected by the water level detector. With this configuration, the amount of stored water can be obtained from the water level of water stored in the reservoir.

In a fuel cell system according to a tenth aspect of the present disclosure, which is based on any one of the first to ninth aspects, the controller may determine the discharge amount of the anode off gas based on a volume of the first supply flow path from a point of connection with the recycle flow path to the anode, a volume of an anode flow path of the fuel cell, a volume of the recycle flow path, a volume of the reservoir, and a volume of the discharge flow path from a point of branch from the recycle flow path to the valve. With this configuration, the volume of the anode off gas which flows through such flow paths and the reservoir can be obtained as the discharge amount of the anode off gas.

In a fuel cell system according to an eleventh aspect of the present disclosure, which is based on any one of the first to ninth aspects, the controller may determine the discharge amount of the anode off gas based on a concentration and a flow rate of impurities condensed from the anode off gas. With this configuration, the discharge amount of the anode off gas can be obtained from the concentration and the flow rate of impurities condensed from the anode off gas such that the concentration of impurities is a predetermined concentration.

According to a twelfth aspect of the present disclosure, there is provided a method of operating a fuel cell system, the fuel cell system including a fuel cell that generates power using a fuel gas and an oxidizing gas, a first supply flow path through which the fuel gas to be supplied to an anode of the fuel cell flows, a second supply flow path through which the oxidizing gas to be supplied to a cathode of the fuel cell flows, a recycle flow path which is connected between the anode and the first supply flow path and through which an anode off gas discharged from the anode flows, a circulator that is provided in the recycle flow path and that allows the anode off gas to flow into the first supply flow path, a discharge flow path which branches off from the recycle flow path and through which the anode off gas flows, a reservoir that is provided in the discharge flow path and that stores water condensed from the anode off gas, and a valve provided in the discharge flow path downstream of the reservoir, the method including: opening the valve; determining an open time, for which the valve is opened to discharge the anode off gas, based on an amount of the water stored in the reservoir, a discharge time of the water that flows through the discharge flow path to be discharged, and a discharge amount of the anode off gas that flows through the discharge flow path to be discharged; and closing the valve when an elapsed time for which the valve is opened reaches the open time.

With this operating method, the time (open time) to discharge the anode off gas is set in light of the status of discharge of water which is discharged prior to the anode off gas. Therefore, an appropriate amount of the anode off gas can be discharged. Hence, a reduction in power generation efficiency due to discharge of hydrogen condensed from the fuel gas more than necessary is suppressed. In addition, there is no need to provide a pressure sensor, which can suppress an increase in cost.

According to a thirteenth aspect of the present disclosure, there is provided a fuel cell system including: a fuel cell that generates power using a fuel gas and an oxidizing gas; a first supply flow path through which the fuel gas to be supplied to an anode of the fuel cell flows; a second supply flow path through which the oxidizing gas to be supplied to a cathode of the fuel cell flows; a recycle flow path which is connected between the anode and the first supply flow path and through which an anode off gas discharged from the anode flows; a circulator that is provided in the recycle flow path and that allows the anode off gas to flow into the first supply flow path; a discharge flow path which branches off from the recycle flow path and through which the anode off gas flows; a reservoir that is provided in the discharge flow path and that stores water condensed from the anode off gas; a valve provided in the discharge flow path downstream of the reservoir; a voltage detector that detects a voltage of the fuel cell; and a controller, in which the controller performs a purge operation by opening the valve, and closing the valve based on a value detected by the voltage detector.

With this configuration, the anode off gas which contains a high concentration of impurities is discharged from the fuel cell via the recycle flow path and the discharge flow path when the valve is opened. Therefore, the concentration of impurities in the anode off gas is lowered, which raises the voltage of the fuel cell which has been lowered by a rise in concentration of impurities. The valve is closed on the basis of the voltage of the fuel cell, and thus the voltage of the fuel cell can be recovered reliably. In addition, there is no need to provide a pressure sensor, a temperature detector, or the like, which can suppress an increase in cost.

In a fuel cell system according to a fourteenth aspect of the present disclosure, which is based on the thirteenth aspect, the controller opens the valve, and closes the valve when the value which is detected by the voltage detector reaches a predetermined value.

With this configuration, the concentration of impurities in the anode off gas during purging is gradually lowered. Therefore, the concentration of impurities in the anode off gas has been reduced and the anode off gas containing much unused hydrogen may unlikely be discharged more than necessary even if the valve is closed after the voltage of the fuel cell reaches the predetermined value. Hence, a reduction in power generation efficiency due to discharge of the anode off gas more than necessary can be suppressed.

Embodiment 1

<Configuration>

A fuel cell system 100 according to Embodiment 1 will be described with reference to FIG. 1. The fuel cell system 100 includes a fuel cell 1, a first supply flow path 2, a second supply flow path 3, a recycle flow path 4, a circulator 5, a discharge flow path (first discharge flow path) 6, a reservoir 7, a valve (e.g., open/close valve) 8, and a controller 20. The fuel cell system 100 may include a discharge flow path (second discharge flow path) 14 to which a cathode off gas is discharged, in addition to the first discharge flow path 6 to which an anode off gas is discharged.

The fuel cell 1 is a device that generates power through an electrochemical reaction between hydrogen in a fuel gas and oxygen in an oxidizing gas. The fuel cell 1 includes a stack (not illustrated) in which a plurality of cells are stacked on each other. The cells are each constituted of an electrolyte in which a polyelectrolyte membrane is used, and a pair of electrodes (an anode and a cathode) that interpose the electrolyte. The cells each include a first flow path (anode flow path) 1a through which the fuel gas is supplied to the anode and a second flow path (cathode flow path) through which the oxidizing gas is supplied to the cathode.

The first supply flow path 2 is a flow path through which the fuel gas to be supplied to the anode of the fuel cell 1 flows, and is connected to the inlet of the first flow path 1a of the fuel cell 1 and a fuel gas supply source (not illustrated). In other words, the first supply flow path 2 is connected between the anode of the fuel cell and the fuel gas supply source. The fuel gas is hydrogen or a gas containing hydrogen. Examples of the fuel gas include a reformed gas obtained through a reforming reaction of a raw material gas, such as a town gas, performed using a reformer, and hydrogen obtained through water electrolysis or the like. The first supply flow path 2 may be provided with a humidifier (not illustrated) that humidifies the fuel gas. The first supply flow path 2 is provided with a first supply unit 9.

The first supply unit 9 is a device that supplies the fuel gas. A constant-capacity pump, for example, is used as the first supply unit 9. In the case where a reformer is used for a supply source of the fuel gas and a raw material gas such as a town gas is supplied to the reformer, for example, the pressure of the fuel gas which is supplied from the reformer to the fuel cell 1 via the first supply flow path 2 may be low, and the primary pressure of the fuel gas may be lower than a pressure loss of the fuel gas which flows through the fuel cell 1, since the pressure of the raw material gas which is supplied to the reformer is low. In this case, the first supply unit 9 may include a pressure booster (not illustrated) that boosts the pressure of the fuel gas. Consequently, the fuel gas at an adequate pressure can be supplied to the fuel cell 1.

In the case where a hydrogen tank or the like is used as the supply source of the fuel gas, for example, the pressure of the fuel gas which is supplied from the supply source may be increased so that the primary pressure of the fuel gas which is supplied to the fuel cell 1 is higher than a pressure loss of the fuel gas which flows through the fuel cell 1. In this case, the first supply unit 9 may include a pressure regulator (not illustrated) that can regulate the pressure of the fuel gas. Consequently, the fuel gas can be regulated to a predetermined pressure that is higher than the pressure loss to be supplied to the fuel cell 1.

The second supply flow path 3 is a flow path through which the oxidizing gas to be supplied to the cathode of the fuel cell 1 flows, and is connected to the inlet of the second flow path 1b of the fuel cell 1 and a second supply unit 10. Air, for example, can be used as the oxidizing gas. In this case, the second supply unit 10 which supplies air to the fuel cell 1 may be provided in the second supply flow path 3. A compressor and an electromagnetic induction diaphragm pump, for example, are used as the second supply unit 10. The second supply flow path 3 may be provided with a humidifier that humidifies the oxidizing gas.

The recycle flow path 4 is a flow path which is connected between the anode and the first supply flow path 2 and through which the anode off gas which is discharged from the anode flows, and is connected to the outlet of the first flow path 1a of the fuel cell 1 and the first supply flow path 2. The first supply flow path 2 which is on the downstream side with respect to the point of connection with the recycle flow path 4, the first flow path 1a, and the recycle flow path 4 constitute a flow path through which the anode off gas which has flowed out of the anode is circulated. In the fuel cell 1, hydrogen in the fuel gas is used for power generation. However, much hydrogen is still condensed from the anode off gas which is discharged from the fuel cell 1. Therefore, the anode off gas can be reused as the fuel gas. Hence, the anode off gas which is discharged from the outlet of the first flow path 1a is circulated, and mixed with the fuel gas which is supplied through the first supply flow path 2 to be supplied again to the inlet of the first flow path 1a as the fuel gas.

The circulator 5 is a device that is provided in the recycle flow path 4 and that allows the anode off gas to flow into the first supply flow path 2. In general, a pressure booster pump is used as the circulator 5. An electromagnetic induction diaphragm pump that can regulate the flow rate of the anode off gas in accordance with an input voltage, for example, is used as the circulator 5.

The first discharge flow path 6 is a flow path which branches off from the recycle flow path 4 and through which the anode off gas flows. The first discharge flow path 6 is connected to the recycle flow path 4 on the upstream side with respect to the circulator 5, and extends to the outside of the fuel cell system 100. The first discharge flow path 6 is provided with the valve 8.

The valve 8 is provided in the first discharge flow path 6 downstream of the reservoir 7. A solenoid electromagnetic valve, for example, is used as the valve 8. When the valve 8 is released to be open, impurities in the anode off gas which flows through the recycle flow path 4, water stored in the reservoir 7, etc. are discharged to the outside through the valve 8 via the first discharge flow path 6.

The reservoir 7 is a device that is provided in the first discharge flow path 6 and that stores water condensed from the anode off gas. A tank, for example, is used as the reservoir 7. Water generated through an electrochemical reaction between hydrogen and oxygen in the fuel cell 1 and water supplied by the humidifier penetrate the polyelectrolyte membrane to enter the anode and the first flow path 1a. Such water is present as water vapor in the fuel cell 1 at a high temperature, but is condensed through heat radiation when the water flows through the first discharge flow path 6 to be stored in the reservoir 7.

The second discharge flow path 14 is connected to the outlet of the second flow path 1b of the fuel cell 1 to discharge the cathode off gas which is discharged from the second flow path 1b. In the case where the second supply flow path 3 is provided with a humidifier, for example, the cathode off gas contains water. Water is generated when the fuel cell 1 generates power, and the cathode off gas also contains such water.

The controller 20 includes a computation unit (not illustrated) such as a central processing unit (CPU) and a storage unit (not illustrated) such as a read only memory (ROM) and a random access memory (RAM). The storage unit stores information such as a basic program of the fuel cell system 100 and various types of fixed data. When the computation unit reads and executes software such as the basic program, the controller 20 controls operation of various portions. The controller 20 may be constituted of a single controller for concentrated control, and may be constituted of a plurality of controllers that cooperate with each other for distributed control.

The controller 20 opens the valve 8, for example. The controller 20 determines an open time for which the valve 8 is opened to discharge the fuel gas, on the basis of the amount of water stored in the reservoir 7, the discharge time of water that flows through the first discharge flow path 6 to be discharged, and the discharge amount of the anode off gas that flows through the first discharge flow path 6 to be discharged. After that, the controller 20 closes the valve 8 when an elapsed time for which the valve 8 is opened reaches the open time.

<Operating Method>

Figure 2:
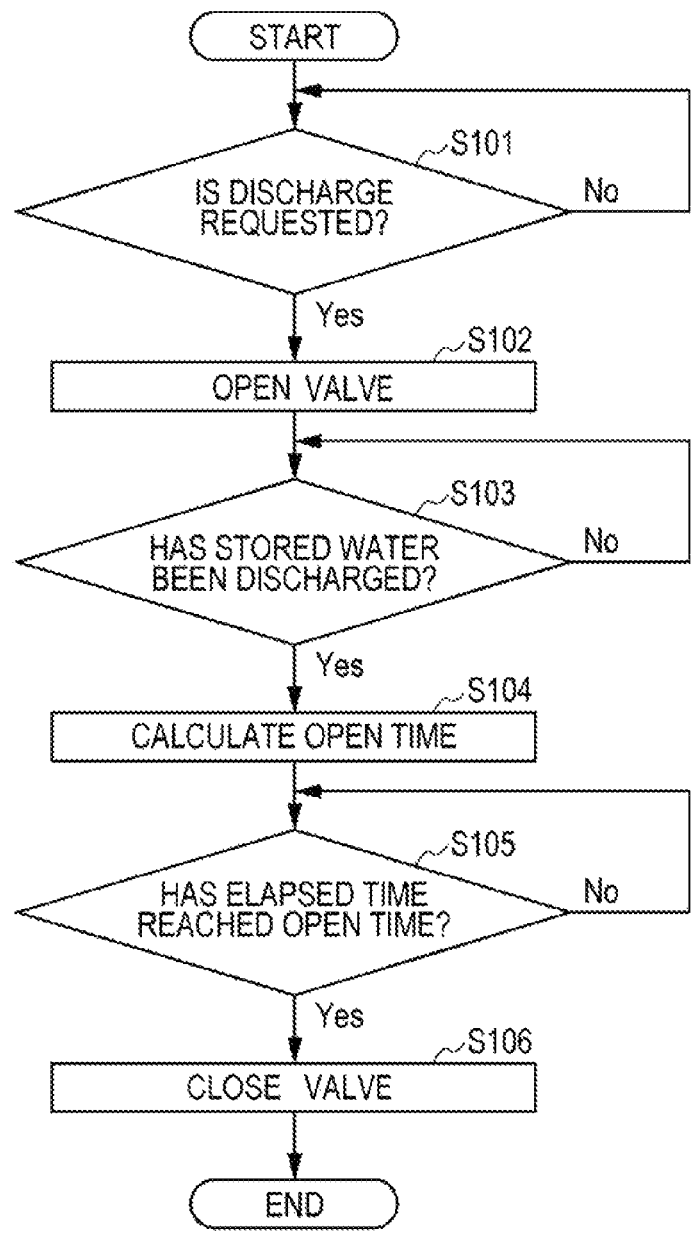
FIG. 2 is a flowchart illustrating an example of a method of operating the fuel cell system of FIG. 1.

A method of operating the fuel cell system 100 will be described with reference to FIG. 2. The operating method is controlled by the controller 20. In the description, air is used as the oxidizing gas.

First, when discharge of the anode off gas is requested in accordance with the operating state of the fuel cell 1 or the like (S101: YES), the controller 20 opens the valve 8 in the first discharge flow path 6 (step S102), and starts measuring the time since the valve 8 is opened. Consequently, water stored in the reservoir 7 is discharged to the outside through the valve 8 via the first discharge flow path 6, and thereafter the anode off gas in the recycle flow path 4 is discharged to the outside through the valve 8 via the first discharge flow path 6.

The discharge time of the anode off gas is fluctuated in accordance with the pressure in the first discharge flow path 6. For example, as the pressure in the first discharge flow path 6 is lower, the rate of the anode off gas and water to be discharged to the outside via the valve 8 from the first discharge flow path 6 is lower, which requires a longer discharge time, and therefore the open time of the valve 8 to discharge the anode off gas is set to be longer.

As the volume of water stored in the reservoir 7 (amount of stored water) is larger, the discharge time of water is longer, and therefore the open time of the valve 8 is set to be longer.

In this way, the open time of the valve 8 to discharge the anode off gas can be obtained on the basis of the amount of stored water and the discharge time of water. Hence, the controller 20 determines whether or not water has been discharged (step S103), and if it is determined that water has been discharged (step S103: YES), the controller 20 measures the time since the valve 8 is opened until it is determined that water has been discharged (discharge time of water). The controller 20 calculates the open time of the valve 8 on the basis of the amount of stored water, the discharge time of water, and the discharge amount of the anode off gas (S104), and starts measuring the time since it is determined that water has been discharged.

Specifically, the controller 20 determines the pressure in the first discharge flow path 6 on the basis of the amount of stored water and the discharge time of water. After that, the controller 20 determines the open time of the valve 8 on the basis of the pressure in the first discharge flow path 6 and the discharge amount of the anode off gas.

Figure 3:
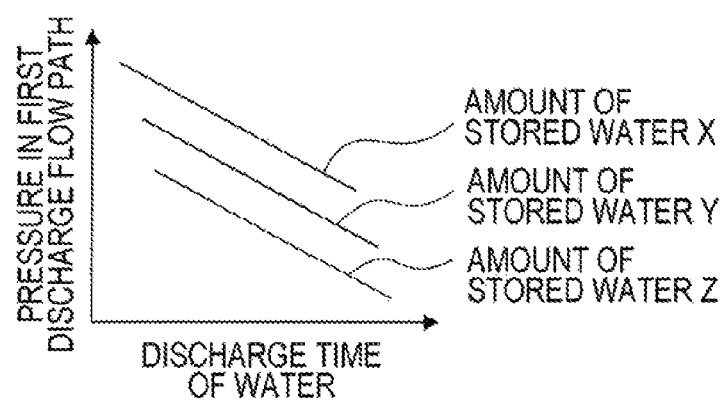
FIG. 3 is a graph illustrating the relationship among the discharge time of water, the amount of stored water, and the pressure in a first discharge flow path.

To determine the pressure in the first discharge flow path 6, the relationship illustrated in FIG. 3 is used. For the same discharge time of water, the pressure in the first discharge flow path 6 becomes higher as the amount of stored water becomes larger in the order of "Z", "Y", and "X". That is, the pressure in the first discharge flow path 6 is lowest in the case where the amount of stored water is smallest at "Z", and the pressure in the first discharge flow path 6 is highest in the case where the amount of stored water is largest at "X".

For the same amount of stored water, the pressure in the first discharge flow path 6 becomes lower as the discharge time of water becomes longer. That is, a longer time is required to discharge water as the pressure in the first discharge flow path 6 is lower. In this way, the pressure in the first discharge flow path 6 can be estimated on the basis of the amount of stored water and the discharge time of water.

Figure 4:
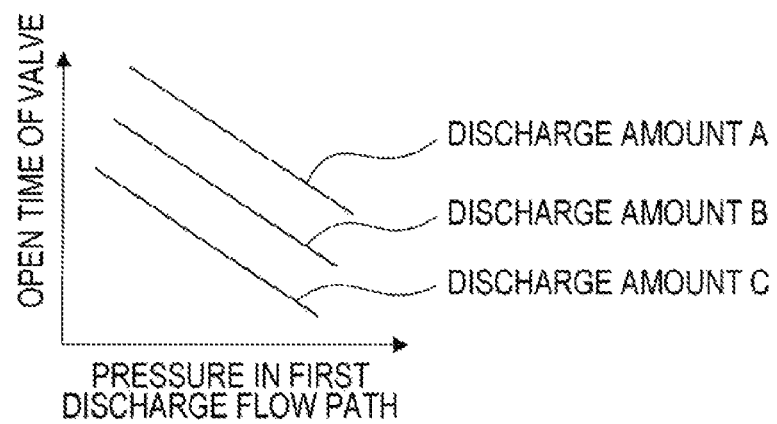
FIG. 4 is a graph illustrating the relationship among the pressure in the first discharge flow path, the discharge amount of an anode off gas, and the open time of the valve.

Next, to determine the open time of the valve 8, the relationship illustrated in FIG. 4 is used. As illustrated in FIG. 4, for the same discharge amount of the anode off gas, the open time of the valve 8 becomes shorter as the pressure in the first discharge flow path 6 becomes higher. That is, a longer time is required to discharge the anode off gas as the pressure in the first discharge flow path 6 is lower.

For the same pressure in the first discharge flow path 6, the open time of the valve 8 becomes longer as the discharge amount of the anode off gas becomes larger in the order of "C", "B", and "A". That is, the open time is shortest in the case where the discharge amount of the gas is smallest at "C", and the open time is longest in the case where the discharge amount of the gas is largest at "A". In this way, the open time of the valve 8 can be determined on the basis of the pressure in the first discharge flow path 6 and the discharge amount of the anode off gas.

The open time of the valve 8, which is based on the pressure in the first discharge flow path 6 and the discharge amount of the anode off gas, can be calculated as described below. First, a discharge rate Kw (m$^3$/sec) of water is higher as the pressure in the first discharge flow path 6 is higher. Therefore, the discharge rate Kw=Qw/Tw of water is obtained from a discharge time Tw (sec) of water and a discharge amount Qw (m$^3$) of water.

As the discharge rate Kw (m$^3$/sec) of water is higher, the pressure in the first discharge flow path 6 is higher, and a discharge rate Kg (m$^3$/sec) of the anode off gas is also higher. Therefore, the discharge rate Kw of water and the discharge rate Kg of the anode off gas are correlated with each other, and such a correlation can be represented as Kw=α·Kg. α is a value determined through an experiment or the like in accordance with the type of the valve 8 and the physical properties of the fluid, and may be a constant or a function.

An open time Tg (sec)=Qg/Kg to discharge the anode off gas can be obtained from the discharge rate Kg (m$^3$/sec) of the anode off gas obtained as described above and a discharge amount Qg (m$^3$) of the anode off gas.

Subsequently, when the elapsed time since it is determined that water has been discharged reaches the open time Tg (step S105: YES), the controller 20 determines that the discharge amount Qg of the anode off gas has been discharged, and closes the valve 8 (step S106). Consequently, an appropriate amount of the anode off gas can be discharged, which allows suppressing a reduction in power generation performance due to the discharge amount of the anode off gas being excessively small while suppressing a reduction in efficiency of use due to the discharge amount of the anode off gas being excessively large. There is no need to use a voltage detector exclusively for detecting discharge of the anode off gas, which allows suppressing an increase in cost.

Embodiment 2

Figure 5:
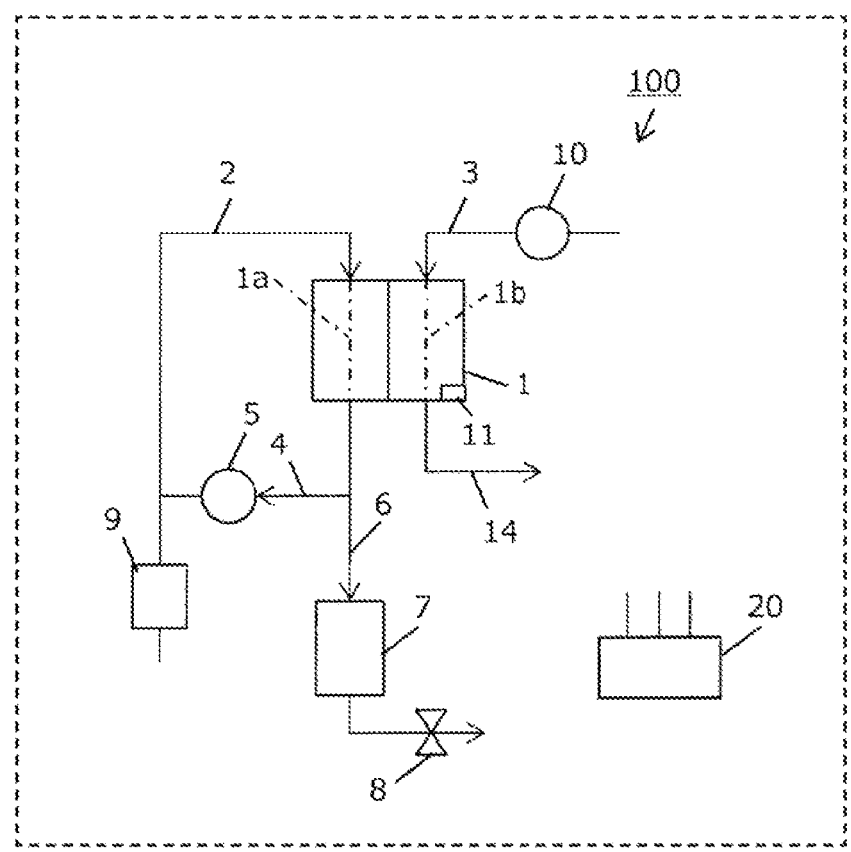
FIG. 5 is a block diagram schematically illustrating an example of the configuration of a fuel cell system according to Embodiment 2 of the present disclosure.

As illustrated in FIG. 5, a fuel cell system 100 according to Embodiment 2 further includes a voltage detector 11 that detects the voltage of the fuel cell 1. The voltage detector 11 is provided to the fuel cell 1, detects the voltage of the fuel cell 1 (voltage of generated power), and outputs the detected voltage to the controller 20. The controller 20 determines the discharge time of water on the basis of the voltage which is detected by the voltage detector 11.

Next, an operation method of the fuel cell system 100 will be described with reference to FIG. 2. The processes of the operation method other than steps S101, S103, and S104 in the flowchart of FIG. 2 are the same as the processes of the operation method of the fuel cell system 100 according to Embodiment 1, and therefore will not be described.

In the process in step S101, it is determined that discharge is requested (step S101: YES). Discharge is requested in the case where the voltage, the constant power generation amount, the time such as the operating time, the amount of impurities that have penetrated, etc. exceeds a predetermined value, for example.

In the process in step S103, the concentration of hydrogen in the fuel gas which is supplied to the anode is not significantly increased with no anode off gas discharged while water is discharged, and therefore the voltage of power generated by the fuel cell 1 is not significantly varied. When discharge of the anode off gas is started after water is discharged, the concentration of hydrogen in the fuel gas starts increasing, and therefore the voltage of generated power stops lowering and starts rising. Hence, the controller 20 determines that water has been discharged when the voltage which is detected by the voltage detector 11 reaches a second predetermined voltage (step S103: YES). The second predetermined voltage is a voltage that is equal to or more than the voltage (minimum voltage) at the time when the voltage of generated power stops lowering, for example.

The controller 20 obtains the time since the valve 8 is opened until it is determined that water has been discharged as the discharge time of water, and calculates the open time of the valve 8 on the basis of the discharge time of water, the amount of stored water, and the discharge amount of the anode off gas (S104).

The voltage detector 11 is normally used to control power generation by the fuel cell 1. By using the voltage detector 11 to determine the discharge time of water, there is no need for the fuel cell system 100 to include a detector exclusively for determining the discharge time of water, which leads to suppressing an increase in cost of the fuel cell system 100.

When the second predetermined voltage is set to the voltage (minimum voltage) at the time when the voltage of generated power stops lowering, measurement of the open time of the valve 8 can be started immediately. Therefore, discharge of the anode off gas more than necessary can be prevented, which further suppresses a reduction in efficiency of use. When the second predetermined voltage is set to a value that is more than the minimum voltage, an erroneous determination due to noise or the like can be prevented. Therefore, discharge of the anode off gas less than the appropriate amount can be prevented, which further suppresses a reduction in power generation performance.

In the process in step S103, the controller 20 may determine that water has been discharged (step S103: YES) when the rate of rise in voltage reaches a predetermined rate, and obtain the discharge time of water since the valve 8 is opened until it is determined that water has been discharged. That is, when discharge of the anode off gas is started after water is discharged, the concentration of hydrogen in the fuel gas starts increasing, and therefore the voltage of generated power stops lowering and starts rising. Therefore, it can be determined that water has been discharged when the rate of rise in voltage reaches the predetermined rate.

Embodiment 3

Figure 6A:
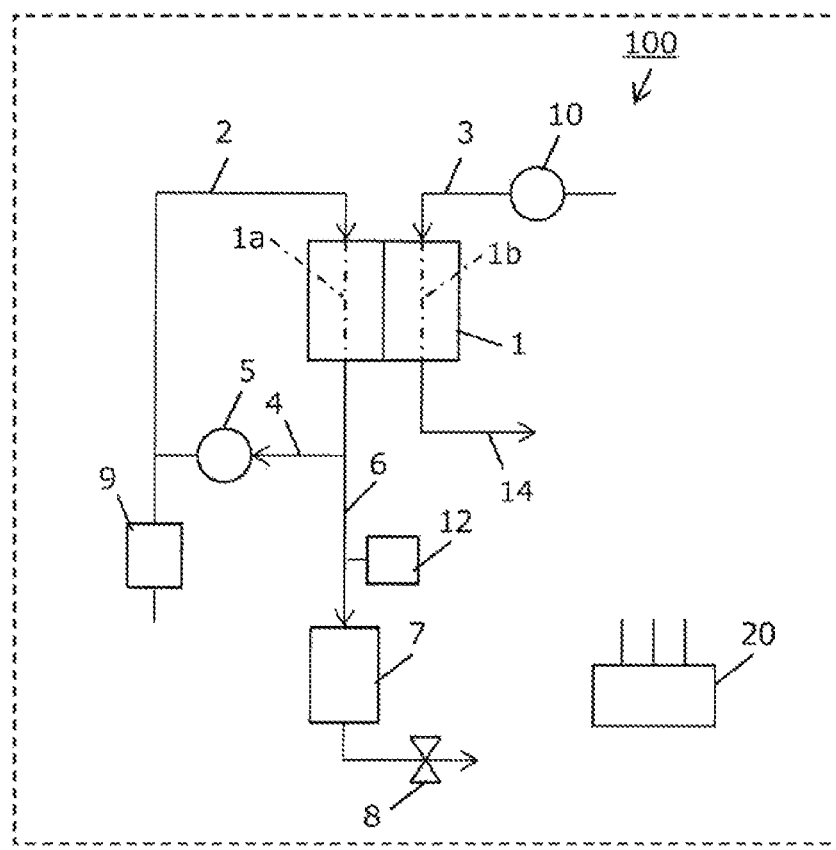
FIG. 6A is a block diagram schematically illustrating an example of the configuration of a fuel cell system according to Embodiment 3 of the present disclosure.

As illustrated in FIG. 6A, a fuel cell system 100 according to Embodiment 3 further includes a temperature detector 12 that detects the temperature of the anode off gas. The temperature detector 12 is provided in the first discharge flow path 6 on the upstream side with respect to the reservoir 7. A thermocouple, a thermistor temperature sensing element, or the like, for example, is used as the temperature detector 12. The temperature detector 12 detects the temperature of the anode off gas which flows through the first discharge flow path 6, and outputs the detected temperature to the controller 20. The controller 20 determines the amount of stored water on the basis of the flow rate of water vapor condensed from the anode off gas and the temperature which is detected by the temperature detector 12.

Next, an operation method of the fuel cell system 100 will be described with reference to FIG. 2. The processes of the operation method other than step S104 in the flowchart of FIG. 2 are the same as the processes of the operation method of the fuel cell system 100 according to Embodiment 1, and therefore will not be described.

That is, the anode off gas which is discharged from the fuel cell 1 is normally discharged to the recycle flow path 4 at a high temperature of about 65 to 75° C. and in a saturated state, and thereafter flows through the recycle flow path 4 and the first discharge flow path 6. Water vapor in the anode off gas is cooled and condensed through heat radiation while flowing through the recycle flow path 4 and the first discharge flow path 6, and condensed water is stored in the reservoir 7 which is provided in the first discharge flow path 6.

When the temperature of the anode off gas which is condensed in the first discharge flow path 6 in this way is detected by the temperature detector 12, the detected temperature indicates the dew point of the anode off gas. Hence, the amount of stored water (condensed water) condensed and stored in the reservoir 7 can be calculated by subtracting the amount of water vapor in the anode off gas, the dew point of which is the temperature which is detected by the temperature detector 12, from the flow rate of water vapor condensed from the anode off gas which is discharged from the fuel cell 1. The flow rate of water vapor condensed from the anode off gas which is discharged from the fuel cell 1 can be estimated from a temperature separately detected by a temperature control unit (not illustrated) of the fuel cell 1.

The controller 20 can calculate the amount of water stored in the reservoir 7 (amount of stored water) by cumulatively integrating the flow rate of condensed water since the preceding discharge of water. The controller 20 calculates the open time of the valve 8 on the basis of the amount of stored water, the discharge amount of the anode off gas, and the discharge time of water (S104).

The position of the temperature detector 12 is not limited to the first discharge flow path 6 as long as the temperature of the anode off gas which flows through the first discharge flow path 6 can be obtained from the temperature which is detected by the temperature detector 12. For example, the temperature detector 12 may be provided in the recycle flow path 4. In this case, if there is a difference between the temperature which is detected by the temperature detector 12 and the temperature of the anode off gas which flows through the first discharge flow path 6, the temperature of the anode off gas may be obtained from the temperature which is detected by the temperature detector 12 so as to compensate for the difference.

Figure 6B:
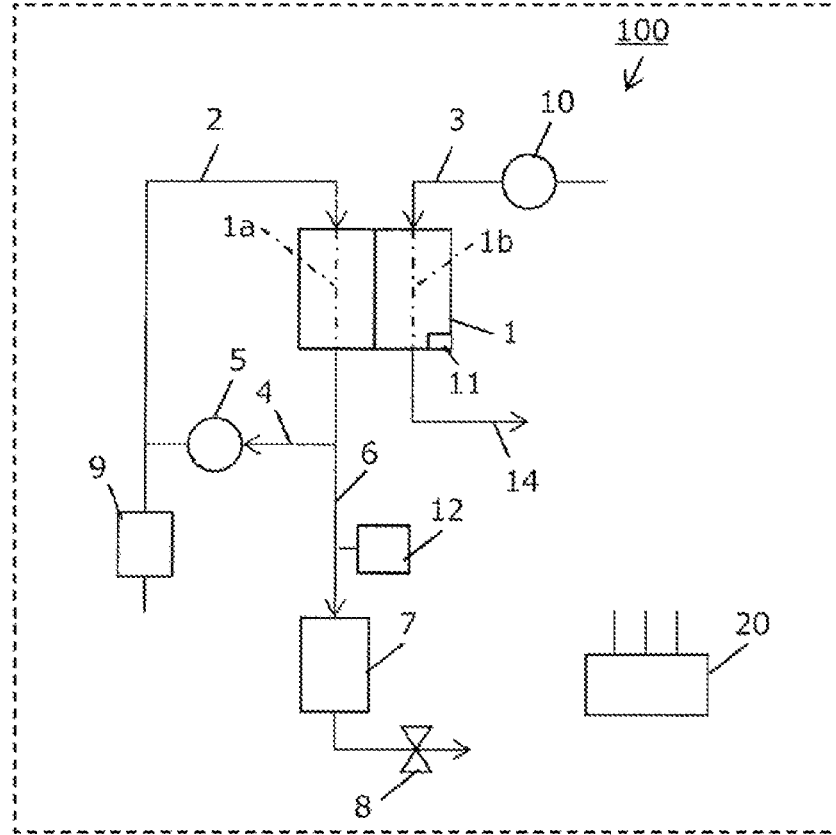
FIG. 6B is a block diagram schematically illustrating an example of the configuration of a fuel cell system according to a modification of Embodiment 3 of the present disclosure.

As illustrated in FIG. 6B, the temperature detector 12 may be provided in the fuel cell system 100 according to Embodiment 2. In this case, the same function and effect as those described above can be achieved because of the presence of the temperature detector 12.

Modification of Embodiment 3

Figure 7A:
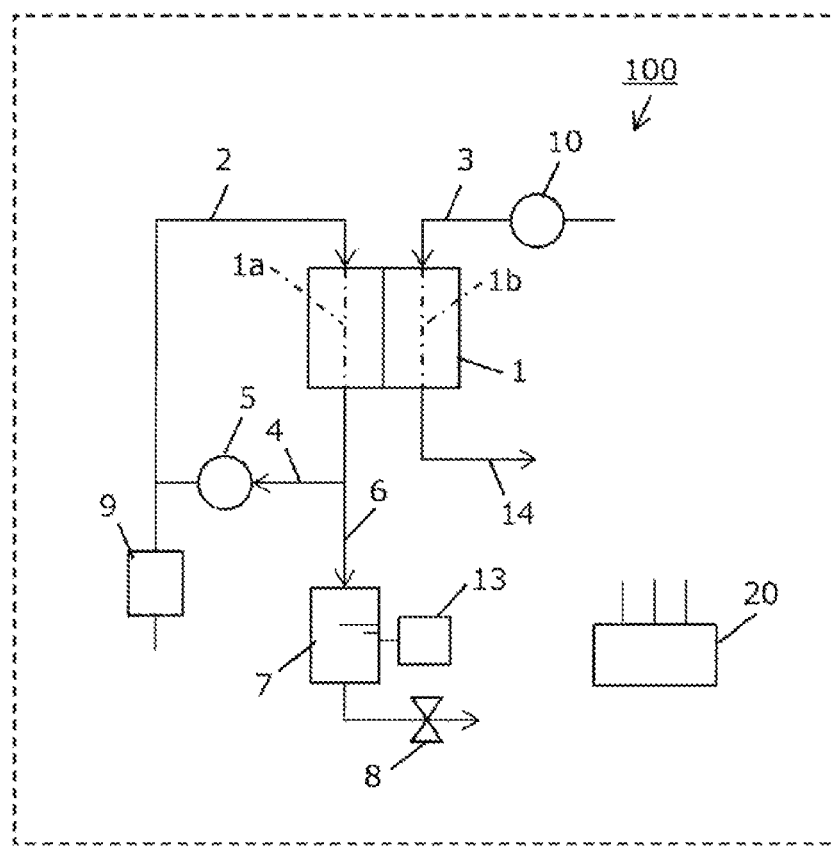
FIG. 7A is a block diagram schematically illustrating an example of the configuration of a fuel cell system according to a modification of Embodiment 3 of the present disclosure.

As illustrated in FIG. 7A, a fuel cell system 100 according to a modification of Embodiment 3 further includes a water level detector 13 that detects the water level of water stored in the reservoir 7. The water level detector 13 is provided to the reservoir 7. A float sensor or the like, for example, is used as the water level detector 13. The water level detector 13 detects changes in water level of water in the reservoir 7, and outputs the detected water level to the controller 20. The controller 20 determines the amount of water stored in the reservoir 7 on the basis of the water level which is detected by the water level detector 13.

Next, an operation method of the fuel cell system 100 will be described with reference to FIG. 2. The processes of the operation method other than step S104 in the flowchart of FIG. 2 are the same as the processes of the operation method of the fuel cell system 100 according to Embodiment 1, and therefore will not be described.

The controller 20 obtains the amount of stored water from the water level which is detected by the water level detector 13, and calculates the open time of the valve 8 on the basis of the amount of stored water, the discharge amount of the anode off gas, and the discharge time of water (S104). The amount of stored water is obtained through calculation and using a predetermined table or the like that correlates the water level of water and the amount of stored water with each other.

Figure 7B:
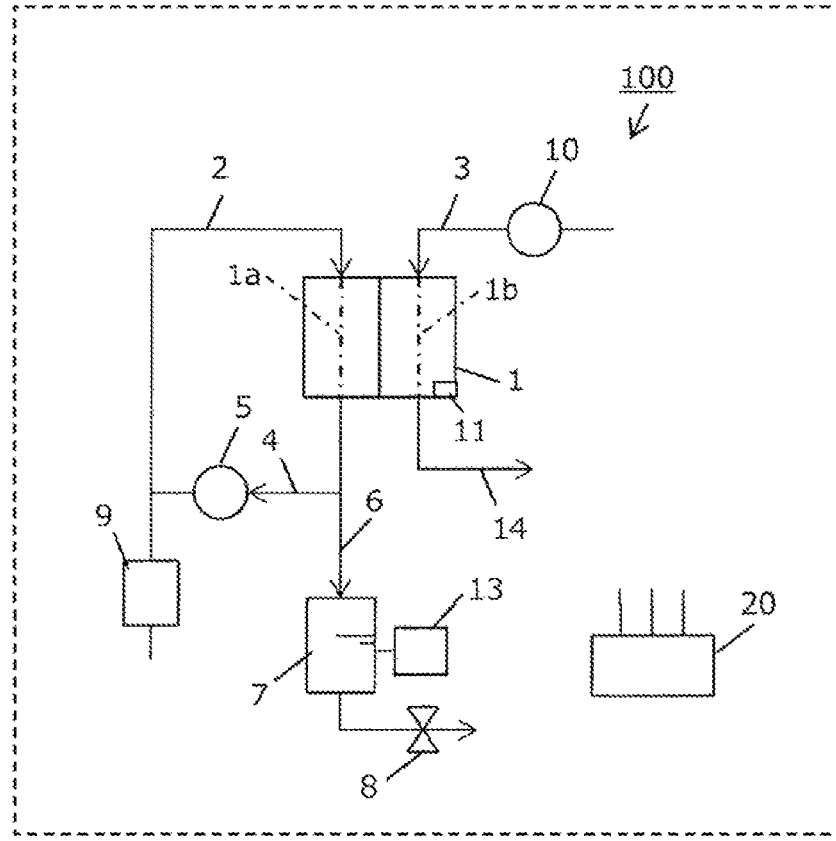
FIG. 7B is a block diagram schematically illustrating an example of the configuration of a fuel cell system according to a modification of Embodiment 3 of the present disclosure.

As illustrated in FIG. 7B, the water level detector 13 may be provided in the fuel cell system 100 according to Embodiment 2. In this case, the same function and effect as those described above can be achieved because of the presence of the water level detector 13.

Embodiment 4

In a fuel cell system 100 according to Embodiment 4, the controller 20 determines the discharge amount of the anode off gas on the basis of a volume of the first supply flow path 2 from the point of connection with the recycle flow path 4 to the anode of fuel cell 1, a volume of the first flow path (anode flow path) 1a of the fuel cell 1, a volume of the recycle flow path 4, a volume of the reservoir 7, and a volume of the first discharge flow path 6 from the point of branch from the recycle flow path 4 to the valve 8.

Next, an operation method of the fuel cell system 100 will be described with reference to FIG. 2. The processes of the operation method other than step S104 in the flowchart of FIG. 2 are the same as the processes of the operation method of the fuel cell system 100 according to Embodiment 1, and therefore will not be described.

That is, when the valve 8 is closed, the anode off gas is discharged from the outlet of the first flow path 1a of the fuel cell 1 to the recycle flow path 4, flows through the recycle flow path 4, flows into the first supply flow path 2 from the point of connection with the recycle flow path 4, flows through the first supply flow path 2, flows into the first flow path 1a from the first supply flow path 2, and flows through the first flow path 1a. When the valve 8 is opened, the anode off gas is discharged from the outlet of the first flow path 1a of the fuel cell 1 to the recycle flow path 4, flows through the recycle flow path 4, flows into the first supply flow path 6 from the point of branch from the recycle flow path 4, and flows through the first discharge flow path 6 and the reservoir 7 which is provided therein to reach the valve 8. Therefore, the anode off gas flows through the first supply flow path 2 from the point of connection with the recycle flow path 4 to the fuel cell 1, the first flow path 1a of the fuel cell 1, the recycle flow path 4, the reservoir 7, and the first discharge flow path 6 from the point of branch from the recycle flow path 4 to the valve 8. Hence, the volume of such spaces can be obtained as the discharge amount of the anode off gas.

The controller 20 calculates the open time of the valve 8 on the basis of the discharge amount of the anode off gas, the amount of stored water, and the discharge time of water (S104). Consequently, the anode off gas for all the volume through which the anode off gas flows is discharged, and substituted by the fuel gas. Therefore, impurities remaining in the fuel gas which flows into the fuel cell 1 can be cleared.

The method of operating the fuel cell system 100 can also be applied to the method of operating the fuel cell system 100 according to any of Embodiments 1 to 3 and modifications thereof.

Modification of Embodiment 4

As illustrated in FIG. 5, a fuel cell system 100 according to a modification of Embodiment 4 further includes a voltage detector 11 that detects the voltage of the fuel cell 1. The voltage detector 11 is provided to the fuel cell 1, detects the voltage of the fuel cell 1 (voltage of generated power), and outputs the detected voltage to the controller 20. The controller 20 determines the discharge amount of the anode off gas on the basis of the concentration of impurities condensed from the anode off gas and the flow rate thereof.

Next, an operation method of the fuel cell system 100 will be described with reference to FIG. 2. The processes of the operation method other than step S104 in the flowchart of FIG. 2 are the same as the processes of the operation method of the fuel cell system 100 according to Embodiment 1, and therefore will not be described.

Specifically, as the concentration of impurities condensed from the anode off gas is increased, the concentration of hydrogen in the fuel gas which is supplied to the anode of the fuel cell 1 is decreased, which accordingly lowers the voltage of power generated by the fuel cell 1.

Air used for power generation by the fuel cell 1 contains nitrogen. Water is generated through a chemical reaction between hydrogen and oxygen as a result of power generation by the fuel cell 1, and water is supplied by a humidifier provided in the first supply flow path 2 or the second supply flow path 3. Therefore, as the amount of power generated by the fuel cell 1 becomes larger, the amount of operation of internal loads such as the humidifier and various supply units used for power generation becomes larger. Hence, the amount of power generated by the fuel cell 1, and hence the flow rate of impurities such as nitrogen and water in the anode off gas, can be obtained on the basis of the amount of operation of the internal loads. The correspondence between the amount of operation of the internal loads and the flow rate of impurities generated through power generation has been obtained in advance through an experiment, calculation, or the like.

Hence, the controller 20 obtains a predetermined discharge amount of the anode off gas that is necessary for the concentration of impurities in the anode off gas to be lowered to a predetermined concentration from the concentration and the flow rate of impurities in the anode off gas. The controller 20 calculates the open time of the valve 8 on the basis of the discharge amount of the anode off gas, the amount of stored water, and the discharge time of water (S104). Consequently, the anode off gas is discharged so that the concentration of impurities in the anode off gas, and hence the concentration of impurities in the fuel gas which is supplied to the fuel cell 1, can be lowered to a predetermined concentration or less.

The method of operating the fuel cell system 100 can also be applied to the method of operating the fuel cell system 100 according to any of Embodiments 1 to 3 and modifications thereof.

Embodiment 5

As illustrated in FIG. 5, a fuel cell system 100 according to Embodiment 5 further includes a voltage detector 11 that detects the voltage of the fuel cell 1. The voltage detector 11 is provided to the fuel cell 1, detects the voltage of the fuel cell 1 (voltage of generated power), and outputs the detected value to the controller 20. The controller 20 opens the valve 8, and closes the valve 8 on the basis of the voltage (detected value) which is detected by the voltage detector 11. For example, the controller 20 closes the valve 8 when the value which is detected by the voltage detector 11 reaches a predetermined value.

Figure 8:
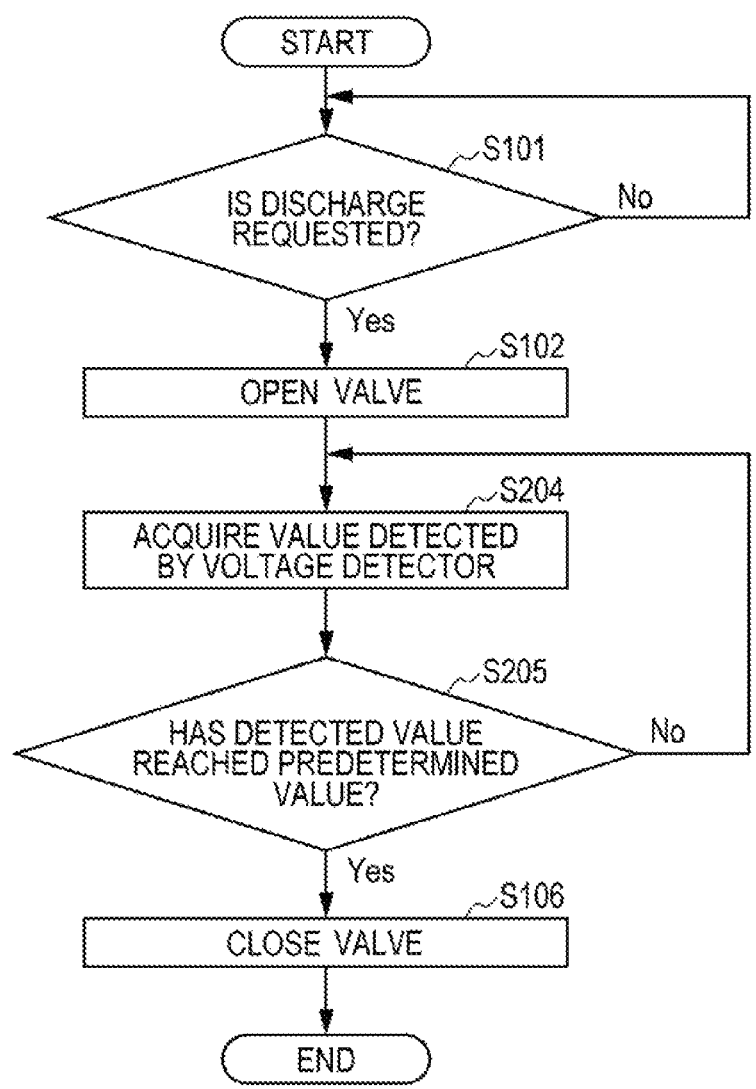
FIG. 8 is a flowchart illustrating an example of a method of operating a fuel cell system according to Embodiment 5 of the present disclosure.

Next, an operation method of the fuel cell system 100 will be described with reference to FIG. 8. In the operation method according to the flowchart of FIG. 8, the processes in steps S204 and S205 are executed in place of the processes in steps S103 to S105 in FIG. 2.

First, when discharge of the anode off gas is requested (S101: YES), the controller 20 opens the valve 8 in the first discharge flow path 6 (step S102). Consequently, water stored in the reservoir 7 is discharged to the outside through the valve 8 via the first discharge flow path 6, and thereafter the anode off gas in the recycle flow path 4 is discharged to the outside through the valve 8 via the first discharge flow path 6.

When the anode off gas is discharged, the concentration of impurities in a circulation flow path for the anode off gas, which is constituted of the first supply flow path 2 and the recycle flow path 4, is lowered. As the concentration of impurities is lowered, the concentration of hydrogen in the fuel gas which is supplied from the first supply flow path 2 to the fuel cell 1 is increased. Therefore, the voltage of the fuel cell 1, which has been lowered by a rise in concentration of impurities (a decrease in concentration of hydrogen in the fuel gas), is raised.

Hence, the controller 20 acquires a value detected by the voltage detector 11 (step S204). The controller 20 repeatedly acquires a value detected by the voltage detector 11 (step S204) until the detected value reaches a predetermined value (step S205: NO). When the detected value reaches the predetermined value (step S205: YES), the controller 20 determines that water and a desired amount of the anode off gas has been discharged, and closes the valve 8 (step S106).

Consequently, a reduction in power generation performance due to the discharge amount of the anode off gas being excessively small can be suppressed while suppressing a reduction in efficiency of use due to the discharge amount of the anode off gas being excessively large. There is no need to use a pressure sensor, a temperature detector, etc. exclusively for detecting discharge of the anode off gas, which allows suppressing an increase in cost.

When the anode off gas is discharged, the concentration of impurities therein is gradually lowered. Therefore, there is little chance that the anode off gas, the concentration of impurities in which has been reduced and which contains much unused hydrogen, is discharged more than necessary even if the valve 8 is closed after the voltage of the fuel cell 1 reaches a predetermined value. Hence, a reduction in power generation efficiency due to discharge of the anode off gas more than necessary can be suppressed.

The embodiments described above may be combined with each other unless one of the combined embodiments excludes the other. For example, the open time of the valve 8 according to Embodiment 1 may be calculated using the discharge time of water according to Embodiment 2, the amount of stored water according to Embodiment 3, and the discharge amount of the anode off gas according to Embodiment 4. The open time of the valve 8 according to Embodiment 1 may be calculated using the discharge time of water according to Embodiment 2, the amount of stored water according to the modification of Embodiment 3, and the discharge amount of the anode off gas according to Embodiment 4. The open time of the valve 8 according to Embodiment 1 may be calculated using the discharge time of water according to Embodiment 2, the amount of stored water according to Embodiment 3, and the discharge amount of the anode off gas according to the modification of Embodiment 4. The open time of the valve 8 according to Embodiment 1 may be calculated using the discharge time of water according to Embodiment 2, the amount of stored water according to the modification of Embodiment 3, and the discharge amount of the anode off gas according to the modification of Embodiment 4.

Many improvements and other embodiments of the present disclosure are apparent to a person skilled in the art from the above description. Thus, the above description should be construed as exemplary only, and is provided for the purpose of teaching the best mode for carrying out the present disclosure to a person skilled in the art. The details of the structure and/or the function can be substantially changed without departing from the spirit of the present disclosure.

The fuel cell system and the method of operating the fuel cell system according to the present disclosure are useful as a fuel cell system and a method of operating the fuel cell system that can suppress a reduction in power generation efficiency and that can suppress an increase in cost.

What is claimed is:

1. A fuel cell system comprising:
   a fuel cell that generates power using a fuel gas and an oxidizing gas;
   a first supply flow path through which the fuel gas to be supplied to an anode of the fuel cell flows;
   a second supply flow path through which the oxidizing gas to be supplied to a cathode of the fuel cell flows;
   a recycle flow path which is connected between the anode and the first supply flow path and through which an anode off gas discharged from the anode flows;
   a circulator that is provided in the recycle flow path and that allows the anode off gas to flow into the first supply flow path;
   a discharge flow path which branches off from the recycle flow path and through which the anode off gas flows;
   a reservoir that is provided in the discharge flow path and that stores water condensed from the anode off gas;
   a valve provided in the discharge flow path downstream of the reservoir; and
   a controller, in a purge operation, programmed to:
   open the valve,
   determine a pressure in the discharge flow path, without using a pressure sensor, based on (1) an amount of the water stored in the reservoir and (2) a discharge time of the water that flows through the discharge flow path to be discharged,
   determine an open time, for which the valve is opened to discharge the anode off gas, based on (1) the pressure in the discharge flow path and (2) a discharge amount of the anode off gas that flows through the discharge flow path to be discharged, and
   close the valve when an elapsed time for which the valve is opened reaches the open time.

2. The fuel cell system according to claim 1,
   wherein the controller is programmed to determine the open time to be shorter as the pressure in the discharge flow path is higher.

3. The fuel cell system according to claim 1,
   wherein the controller is programmed to determine the open time to be longer as the discharge time of the water is longer.

4. The fuel cell system according to claim 1, further comprising:
   a voltage detector that detects a voltage of the fuel cell,
   wherein the controller is programmed to determine the discharge time of the water based on the voltage which is detected by the voltage detector.

5. The fuel cell system according to claim 4,
   wherein the controller is programmed to determine the discharge time of the water when the voltage reaches a predetermined voltage.

6. The fuel cell system according to claim 4,
   wherein the controller is programmed to determine the discharge time of the water when a rate of rise in the voltage reaches a predetermined rate.

7. The fuel cell system according to claim 1, further comprising:
   a temperature detector that detects a temperature of the anode off gas which flows through the discharge flow path,
   wherein the controller is programmed to determine the amount of the stored water based on a flow rate of water vapor condensed from the anode off gas which is discharged from the fuel cell and the temperature which is detected by the temperature detector.

8. The fuel cell system according to claim 1, further comprising:
   a water level detector that detects a water level of the water which is stored in the reservoir,
   wherein the controller is programmed to determine the amount of the stored water based on the water level which is detected by the water level detector.

9. The fuel cell system according to claim 1,
   wherein the controller is programmed to determine the discharge amount of the anode off gas based on a volume of the first supply flow path from a point of connection with the recycle flow path to the anode, a volume of an anode flow path of the fuel cell, a volume of the recycle flow path, a volume of the reservoir, and a volume of the discharge flow path from a point of branch from the recycle flow path to the valve.

10. The fuel cell system according to claim 1,
    wherein the controller is programmed to determine the discharge amount of the anode off gas based on a concentration and a flow rate of impurities condensed from the anode off gas.

* * * * *